US012659193B2

(12) United States Patent
Homchaudhuri et al.

(10) Patent No.:  US 12,659,193 B2
(45) Date of Patent:  Jun. 16, 2026

(54) RADIO FREQUENCY SENSING

(71) Applicant: QUALCOMM Incorporated, San Diego, CA (US)

(72) Inventors: Sandip Homchaudhuri, San Jose, CA (US); Xiaoxin Zhang, Sunnyvale, CA (US); Harinder Singh, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 18/193,594

(22) Filed: Mar. 30, 2023

(65) Prior Publication Data

US 2023/0344678 A1     Oct. 26, 2023

Related U.S. Application Data

(60) Provisional application No. 63/363,290, filed on Apr. 20, 2022.

(51) Int. Cl.
| | |
|---|---|
| *H04L 61/103* | (2022.01) |
| *H04L 25/02* | (2006.01) |
| *H04W 64/00* | (2009.01) |

(52) U.S. Cl.
CPC .......... *H04L 25/022* (2013.01); *H04L 61/103* (2013.01); *H04W 64/006* (2013.01)

(58) Field of Classification Search
CPC ............................ H04L 25/022; H04L 61/103
USPC ........................................................ 370/328
See application file for complete search history.

(56) References Cited

U.S. PATENT DOCUMENTS

| | | |
|---|---|---|
| 2020/0400778 A1 | 12/2020 | Da Silva et al. |
| 2022/0005337 A1 | 1/2022 | Shin et al. |

FOREIGN PATENT DOCUMENTS

| | | | | |
|---|---|---|---|---|
| CA | 3152900 A1 | * | 5/2021 | ......... H04L 25/0224 |
| CN | 104502894 A | * | 4/2015 | .............. G01V 3/12 |
| ES | 2340954 T3 | * | 6/2010 | ........... G06F 13/385 |

OTHER PUBLICATIONS

International Search Report and Written Opinion—PCT/US2023/017116—ISA/EPO—Jul. 7, 2023.

* cited by examiner

*Primary Examiner* — Sibte H Bukhari
(74) *Attorney, Agent, or Firm* — Harrity & Harrity, LLP

(57)     ABSTRACT

Various aspects of the present disclosure generally relate to wireless communication. In some aspects, a sensing device may transmit a first Layer 2 (L2) data packet that includes a Layer 2.5 (L2.5) frame. The sensing device may receive a second L2 data packet that includes a response to the L2.5 frame. Motion data indicating whether an object is moving may be generated based at least in part on a channel frequency response associated with receiving the second L2 data packet. Numerous other aspects are described.

24 Claims, 5 Drawing Sheets

400

410    Transmit a first Layer 2 (L2) data packet that includes a Layer 2.5 (L2.5) frame 420    Receive a second L2 data packet that includes a response to the L2.5 frame, where motion data indicating whether an object is moving is generated based at least in part on a channel frequency response (CFR) associated with receiving the second L2 data packet

RADIO FREQUENCY SENSING

CROSS-REFERENCE TO RELATED APPLICATION

This Patent application claims priority to U.S. Provisional Patent Application No. 63/363,290, filed on Apr. 20, 2022, entitled "RADIO FREQUENCY SENSING" and assigned to the assignee hereof. The disclosure of the prior application is considered part of and is incorporated by reference into this Patent Application.

FIELD OF THE DISCLOSURE

Aspects of the present disclosure generally relate to wireless communication and to techniques and apparatuses for radio frequency sensing.

BACKGROUND

Wireless communication systems are widely deployed to provide various telecommunication services such as telephony, video, data, messaging, and broadcasts.

Typical wireless communication systems may employ multiple-access technologies capable of supporting communication with multiple users by sharing available system resources (e.g., bandwidth, transmit power, or the like). A wireless local area network (WLAN) may be formed by one or more access points (APs) that provide a shared wireless communication medium for use by a number of client devices also referred to as stations (STAs). The basic building block of a WLAN conforming to the 802.11 family of standards is a basic service set, which is managed by an AP. Generally, a basic service set is a network topology that enables wireless devices (e.g., a group of STAs) to communicate through a common medium (e.g., an AP). Each basic service set is identified by a service set identifier (SSID) that is advertised by the AP. An AP periodically broadcasts beacon frames to enable any STAs within wireless range of the AP to establish or maintain a communication link with the WLAN.

A STA may communicate with an AP via downlink communications and uplink communications. "Downlink" (or "DL") refers to a communication link from the AP to the STA, and "uplink" (or "UL") refers to a communication link from the STA to the AP.

SUMMARY

Some aspects described herein relate to a method of wireless communication performed by a sensing device. The method may include transmitting a first Layer 2 (L2) data packet that includes a layer 2.5 (L2.5) frame. The method may include receiving a second L2 data packet that includes a response to the L2.5 frame, where motion data indicating whether an object is moving is generated based at least in part on a channel frequency response (CFR) associated with receiving the second L2 data packet.

Some aspects described herein relate to a sensing device for wireless communication. The sensing device may include a memory and one or more processors coupled to the memory. The one or more processors may be configured to transmit a first L2 data packet that includes an L2.5 frame. The one or more processors may be configured to receive a second L2 data packet that includes a response to the L2.5 frame, where motion data indicating whether an object is moving is generated based at least in part on a CFR associated with receiving the second L2 data packet.

Some aspects described herein relate to a non-transitory computer-readable medium that stores a set of instructions for wireless communication by a sensing device. The set of instructions, when executed by one or more processors of the sensing device, may cause the sensing device to transmit a first L2 data packet that includes an L2.5 frame. The set of instructions, when executed by one or more processors of the sensing device, may cause the sensing device to receive a second L2 data packet that includes a response to the L2.5 frame, where motion data indicating whether an object is moving is generated based at least in part on a CFR associated with receiving the second L2 data packet.

Some aspects described herein relate to an apparatus for wireless communication. The apparatus may include means for transmitting a first L2 data packet that includes an L2.5 frame. The apparatus may include means for receiving a second L2 data packet that includes a response to the L2.5 frame, where motion data indicating whether an object is moving is generated based at least in part on a CFR associated with receiving the second L2 data packet.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a WLAN, aspects of the present disclosure can be applied to other wireless communication technologies, such as a 5G or New Radio (NR) radio access technology (RAT), a 3G RAT, a 4G RAT, and/or a RAT subsequent to 5G (e.g., 6G).

Figure 1:
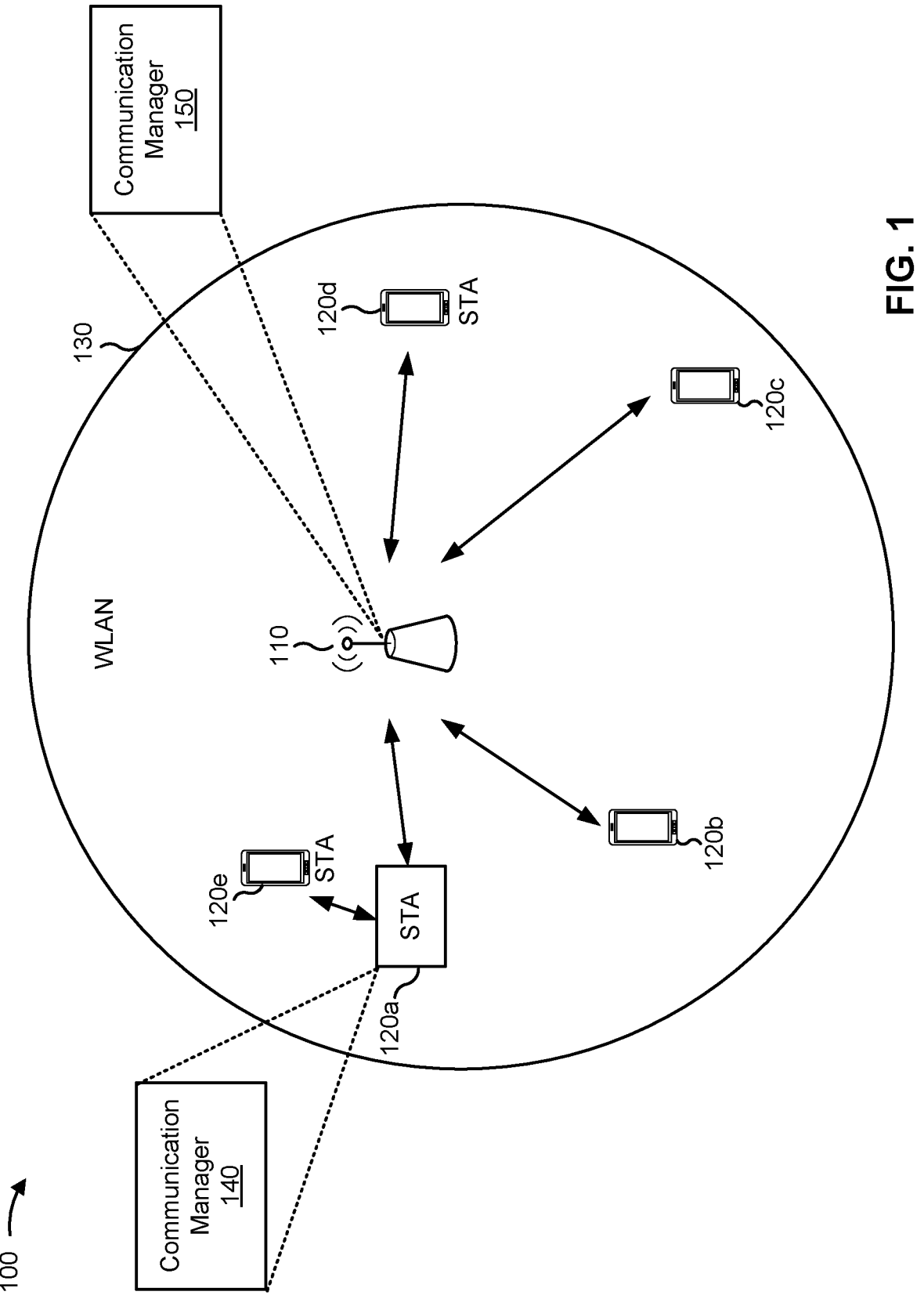
FIG. 1 is a diagram illustrating an example of a wireless network, in accordance with the present disclosure.

FIG. 1 is a diagram illustrating an example of a wireless network 100, in accordance with the present disclosure. According to some aspects, the network 100 can be an example of a WLAN. For example, the network 100 can be a network implementing at least one of the Institute of Electrical and Electronics Engineers (IEEE) 802.11 family of standards. The network 100 may include numerous wireless devices such as an access point (AP) 110 and multiple associated stations (STAs) 120. Each of the STAs 120 also may be referred to as a client device, a mobile station (MS), a mobile device, a mobile handset, a wireless handset, an access terminal (AT), a user equipment (UE), a subscriber station (SS), or a subscriber unit, among other examples.

The STAs 120 may be dispersed throughout the wireless network 100, and each STA 120 may be stationary or mobile. A STA 120 may include, for example, an access terminal, a terminal, a mobile station, and/or a subscriber unit. A STA 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some STAs 120 may be considered machine-type communication (MTC) or evolved or enhanced machine-type communication (eMTC) STAs. An MTC STA and/or an eMTC STA may include, for example, a robot, a drone, a remote device, a sensor, a meter, a monitor, and/or a location tag, that may communicate with a base station, another device (e.g., a remote device), or some other entity. Some STAs 120 may be considered Internet-of-Things (IoT) devices, and/or may be implemented as NB-IoT (narrowband IoT) devices. Some STAs 120 may be considered a Customer Premises Equipment. A STA 120 may be included inside a housing that houses components of the STA 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

Each of the STAs 120 may associate and communicate with the AP 110 via a communication link. The various STAs 120 in the network 100 are able to communicate with one another through the AP 110. A single AP 110 and an associated set of STAs 120 may be referred to as a basic service set. FIG. 1 additionally shows an example coverage area 130 of the AP 110, which may represent a basic service area (BSA) of the network 100. While only one AP 110 is shown, the network 100 can include multiple APs 110. An extended service set (ESS) may include a set of connected basic service sets. An extended network station associated with the network 100 may be connected to a wired or wireless distribution system that may allow multiple APs 110 to be connected in such an ESS. As such, a STA 120 can be covered by more than one AP 110 and can associate with different APs 110 at different times for different transmissions.

STAs 120 may function and communicate (via the respective communication links) according to the IEEE 802.11 family of standards and amendments including, but not limited to, 802.11a, 802.11b, 802.11g, 802.11n, 802.11ac, 802.11ad, 802.11ah, 802.11ay, 802.11ax, 802.11az, and 802.11ba. These standards define the WLAN radio and baseband protocols for the physical layer and medium access control (MAC) layer. The wireless devices in the network 100 may communicate over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. The unlicensed spectrum may also include other frequency bands, such as the 6 GHz band. The wireless devices in the network 100 also can be configured to communicate over other frequency bands such as shared licensed frequency bands, in which multiple operators may have a license to operate in the same or overlapping frequency band or bands.

In some examples, STAs 120 may form networks without APs 110 or other equipment other than the STAs 120 themselves. One example of such a network is an ad hoc network (or wireless ad hoc network). Ad hoc networks may alternatively be referred to as mesh networks or peer-to-peer (P2P) connections. In some examples, ad hoc networks may be implemented within a larger wireless network such as the network 100. In such implementations, while the STAs 120 may be capable of communicating with each other through the AP 110, STAs 120 also can communicate directly with each other via direct wireless communication links. Additionally, two STAs 120 may communicate via a direct communication link regardless of whether both STAs 120 are associated with and served by the same AP 110. In such an ad hoc system, one or more of the STAs 120 may assume the role filled by the AP 110 in a basic service set. Such a STA 120 may be referred to as a group owner (GO) and may coordinate transmissions within the ad hoc network. Examples of direct wireless communication links include Wi-Fi Direct connections, connections established by using a Wi-Fi Tunneled Direct Link Setup (TDLS) link, and other P2P group connections.

In some examples, some types of STAs 120 or APs 110 may be configured for extended high throughput (EHT) operations and may have supported functionality on a dynamic channel bandwidth spectrum. The dynamic channel bandwidth spectrum may be a portion of the frequency spectrum that includes frequency bands above the radio frequency (RF) spectrum, including frequency bands traditionally used for Wi-Fi technology or the emerging 6 GHz band. Each band (for example, the 5 GHz band) may contain multiple channels (for example, each channel may span 20 MHz in frequency, 40 MHz in frequency, 80 MHz in frequency), each of which may be usable by configured STAs 120 or APs 110. Based on the enhanced functionality supported by EHT modes of operation, supported extensions to available channel bandwidth spectrum (for example, 320 MHz, 160+160 MHz) may be possible.

Some types of STAs 120 may provide for automated communication. Automated wireless devices may include those implementing IoT communication, Machine-to-Machine (M2M) communication, or MTC. IoT, M2M or MTC may refer to data communication technologies that allow devices to communicate without human intervention. For example, IoT, M2M or MTC may refer to communications from STAs 120 that integrate sensors or meters to measure or capture information and relay that information to a central server or application program that can make use of the information or present the information to humans interacting with the program or application.

Some types of APs 110 may provide for AP coordination using over-the-air signaling. Different levels of coordination may be supported by the APs 110, with associated synchronization for the different levels. For example, in some examples, one or more APs 110 may support coordination without synchronization (in some examples, known as level-1 synchronization) in which the APs 110 may coordinate to share load information, user-management, admission control, and basic service set transition management, such as handover. In some examples, one or more APs 110 may support coordination with loose synchronization (in some examples, known as level-2 synchronization) in which APs 110 may coordinate for interference management and simultaneous transmission on a transmission opportunity (TXOP) by TXOP basis. In some examples, one or more APs 110 may support coordination with tight (for example, symbol level) synchronization (in some examples, known as level-3 synchronization) in which APs 110 may perform coordinated beamforming and transmit null packets to STAs 120 served on other basic service sets, to reduce interference. In other cases, one or more APs 110 may support coordination with tight (for example, sub-symbol level) synchronization (in some examples, known as level-4 synchronization) in which APs 110 may coordinate for a joint multiple-input, multiple-output (MIMO) wireless systems transmission, in which a STA 120 may be served by multiple APs 110.

Some of STAs 120 may be MTC devices, such as MTC devices designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

Network 100 may support beamformed transmissions. As an example, the AP 110 may use multiple antennas or antenna arrays to conduct beamforming operations for directional communications with a STA 120. Beamforming (which may also be referred to as spatial filtering or directional transmission) is a signal processing technique that may be used at a transmitter (for example, the AP 110) to shape or steer an overall antenna beam in the direction of a target receiver (for example, a STA 120). Beamforming may be achieved by combining elements in an antenna array in such a way that transmitted signals at particular angles experience constructive interference while others experience destructive interference. In some examples, the ways in which the elements of the antenna array are combined at the transmitter may depend on channel state information (CSI) associated with the channels over which the AP 110 may communicate with the STA 120. That is, based on this CSI, the AP 110 may appropriately weight the transmissions from each antenna (for example, or antenna port) such that the desired beamforming effects are achieved. In some examples, these weights may be determined before beamforming can be employed. For example, the transmitter (for example, the AP 110) may transmit one or more sounding packets to the receiver in order to determine CSI.

Network 100 may further support MIMO wireless systems. Such systems may use a transmission scheme between a transmitter (for example, the AP 110) and a receiver (for example, a STA 120), in which both transmitter and receiver are equipped with multiple antennas. For example, the AP 110 may have an antenna array with a number of rows and columns of antenna ports that the AP 110 may use for beamforming in its communication with a STA 120. Signals may be transmitted multiple times in different directions (for example, each transmission may be beamformed differently). The receiver (for example, STA 120) may try multiple beams (for example, antenna subarrays) while receiving the signals.

WLAN packet data units (PDUs) may be transmitted over a radio frequency spectrum band, which in some examples may include multiple sub-bands or frequency channels. In some examples, the radio frequency spectrum band may have a bandwidth of 80 MHz, and each of the sub-bands or channels may have a bandwidth of 20 MHz. Transmissions to and from STAs 120 and APs 110 typically include control information within a header that is transmitted prior to data transmissions. The information provided in a header is used by a receiver to decode the subsequent data. A legacy WLAN preamble may include legacy short training field (STF) (L-STF) information, legacy long training field (L-LTF) information, and legacy signaling (L-SIG) information. The legacy preamble may be used for packet detection, automatic gain control and channel estimation, among other uses. The legacy preamble may also be used to maintain compatibility with legacy devices.

In some aspects, the STA 120 may include a communication manager 140. As described in more detail elsewhere herein, the communication manager 140 may perform one or more operations associated with RF sensing. Additionally, or alternatively, the communication manager 140 may perform one or more other operations described herein.

In some aspects, the AP 110 may include a communication manager 150. As described in more detail elsewhere herein, the communication manager 150 may perform one or more operations associated with RF sensing. Additionally, or alternatively, the communication manager 150 may perform one or more other operations described herein.

In some aspects, a sensing device (e.g., a STA 120, an AP 110) may include a communication manager 140 or 150. As described in more detail elsewhere herein, the communication manager 140 or 150 may transmit a first Layer 2 (L2) data packet that includes a Layer 2.5 (L2.5) frame. The communication manager 140 or 150 may receive a second L2 data packet that includes a response to the L2.5 frame, where motion data indicating whether an object is moving is generated based at least in part on a channel frequency response (CFR) associated with receiving the second L2 data packet. Additionally, or alternatively, the communication manager 140 or 150 may perform one or more other operations described herein.

As indicated above, FIG. 1 is provided as an example. Other examples may differ from what is described with regard to FIG. 1.

Figure 2:
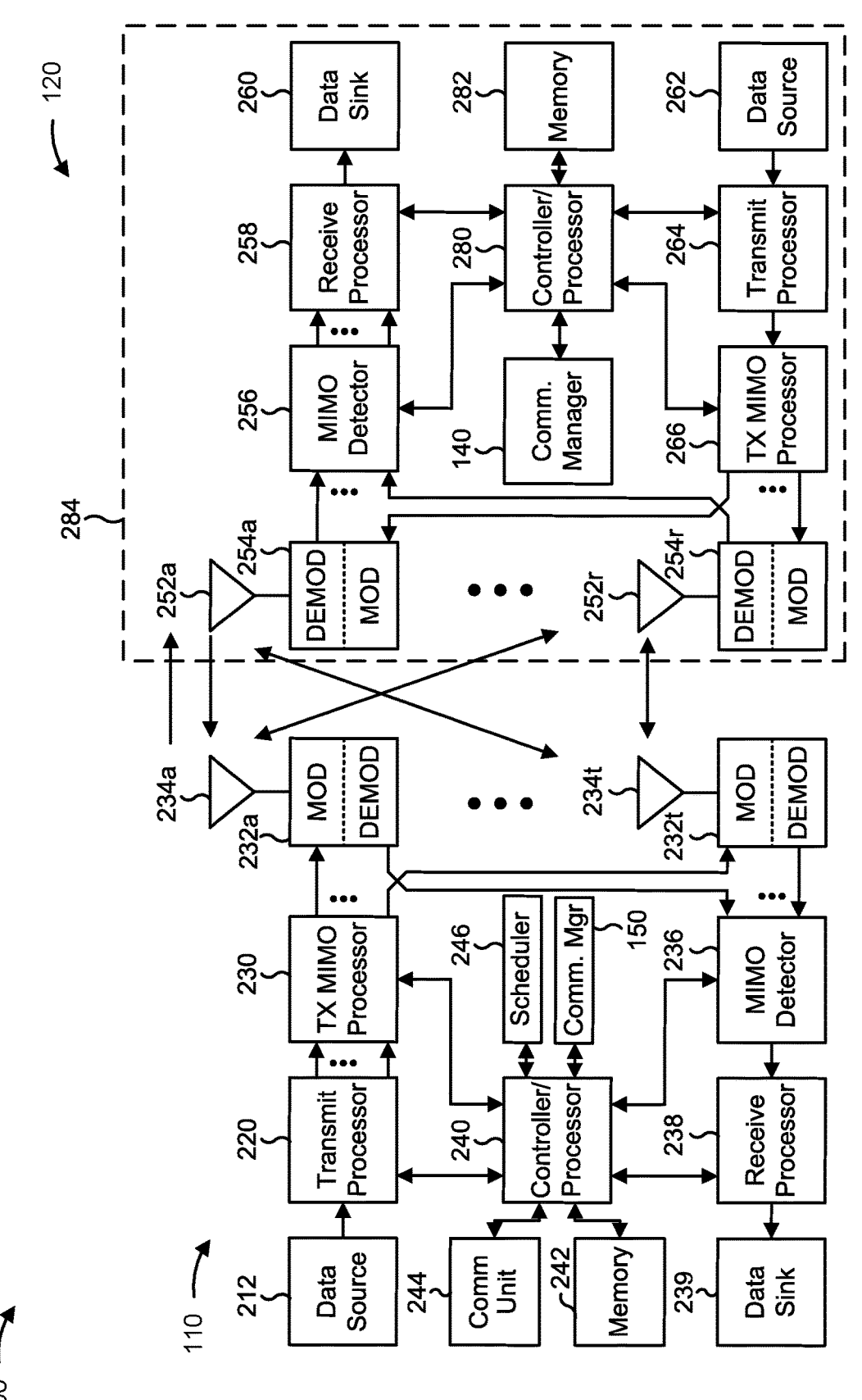
FIG. 2 is a diagram illustrating an example of an access point in communication with a station in a wireless network, in accordance with the present disclosure.

FIG. 2 is a diagram illustrating an example 200 of an AP 110 in communication with a STA 120 in a wireless network 100, in accordance with the present disclosure. The AP 110 may be equipped with a set of antennas 234a through 234t, such as T antennas (T≥1). The STA 120 may be equipped with a set of antennas 252a through 252r, such as R antennas (R≥1).

At the AP 110, a transmit processor 220 may receive data, from a data source 212, intended for the STA 120 (or a set of STAs 120). The transmit processor 220 may select one or more modulation and coding schemes (MCSs) for the STA 120 based at least in part on one or more channel quality indicators (CQIs) received from that STA 120. The AP 110 may process (e.g., encode and modulate) the data for the STA 120 based at least in part on the MCS(s) selected for the STA 120 and may provide data symbols for the STA 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) MIMO processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for orthogonal frequency-division multiplexing (OFDM)) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the STA 120, a set of antennas 252 (shown as antennas 252a through 252r) may receive the downlink signals from the AP 110 and/or other APs 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the STA 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the STA 120 may be included in a housing 284.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the STA 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the AP 110. In some examples, the modem 254 of the STA 120 may include a modulator and a demodulator. In some examples, the STA 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-5).

At the AP 110, the uplink signals from STA 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the STA 120. The receive processor 238 may provide the decoded data to a data sink 239 and provide the decoded control information to the controller/processor 240. The AP 110 may include a communication unit 244 and may communicate with a network controller via the communication unit 244. The AP 110 may include a scheduler 246 to schedule one or more STAs 120 for downlink and/or uplink communications. In some examples, the modem 232 of the AP 110 may include a modulator and a demodulator. In some examples, the AP 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-5).

The controller/processor 240 of the AP 110, the controller/processor 280 of the STA 120, and/or any other component(s) of FIG. 2 may perform one or more techniques associated with RF sensing, as described in more detail elsewhere herein. In some aspects, the sensing device and/or the target device described herein is the AP 110, is included in the AP 110, or includes one or more components of the AP 110. In some aspects, the sensing device and/or the target device described herein is the STA 120, is included in the STA 120, or includes one or more components of the STA 120. For example, the controller/processor 240 of the AP 110, the controller/processor 280 of the STA 120, and/or any other component(s) of FIG. 2 may perform or direct operations of, for example, process 400 of FIG. 4, and/or other processes as described herein. The memory 242 and the memory 282 may store data and program codes for the AP 110 and the STA 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the AP 110 and/or the STA 120, may cause the one or more processors, the STA 120, and/or the AP 110 to perform or direct operations of, for example, process 400 of FIG. 4, and/or other processes as described herein. In some examples, executing instructions may include running the instructions, converting the instructions, compiling the instructions, and/or interpreting the instructions, among other examples.

In some aspects, the sensing device includes means for transmitting a first Layer 2 (L2) data packet that includes a Layer 2.5 (L2.5) frame; and/or means for receiving a second L2 data packet that includes a response to the L2.5 frame, wherein motion data indicating whether an object is moving is generated based at least in part on a channel frequency response (CFR) associated with receiving the second L2 data packet. In some aspects, the means for the sensing device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the sensing device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Within a WLAN, a sensing device (e.g., an AP or an STA) may determine motion information (e.g., a direction of movement and/or a speed) of a target device (e.g., a STA) based at least in part on performing RF sensing. For example, the sensing device may transmit a frame (e.g., a Wi-Fi frame) to a target device to cause the target to transmit a response (e.g., another Wi-Fi frame) to the sensing device. A CFR may be captured implicitly from a preamble of the response. The CFR may provide a heatmap of a communication channel over which the response was received at a given instant in time and spread across various tones and their complex response.

The sensing device may continuously and periodically transmit frames to the target device to obtain response frames, from which heatmaps of the communication channel can be generated, continuously and periodically. The heatmaps may be processed to determine motion data associated with target device (e.g., whether the target device is moving and, if the target device is moving, a speed and/or a direction of the movement).

To ensure accuracy, the target device may need to transmit a response for each frame transmitted to the target device by the sensing device. Additionally, a response received at full channel bandwidth (CBW) may enable more precise channel identification and may increase a reliability associated with determining the motion data.

However, in some cases, the target device may not transmit a response to a frame received from the sensing device. For example, the sensing device may periodically transmit a Layer 3 (L3) frame, such as an internet control message protocol (ICMP) ping, to the target device at full CBW. Initially, the target device may transmit a response to the L3 frame (e.g., an L3 ICMP ping reply) and the response may be transmitted within an L2 WLAN frame at full CBW. However, to conserve battery power, the target device may include logic configured to determine whether a frame is unnecessarily transmitted and, if so, to prevent the target device from transmitting a response to the frame.

For example, the L3 frame may invoke an L3 stack of the target device. The L3 stack may be run alongside the main high level operating system (HLOS) of the target device and invoking the L3 stack may utilize a relatively large amount of power. Therefore, the target device may include logic to prevent the L3 stack from being unnecessarily invoked.

By contrast, the target device may offload Wi-Fi features to a low memory footprint software on chip (SoC) component. Further, the SoC may periodically wake up to listen to buffered data indications and to perform one or more L2 and/or L2.5 functionalities. Thus, the target device may be configured to automatically transmit an L2 acknowledgement (ACK) based at least in part on receiving an L2 frame.

Because the target device may be configured to automatically transmit an L2 ACK based at least in part on receiving an L2 frame, the sensing device may perform RF sensing based at least in part on periodically transmitting a L2 frame (e.g., a quality of service null frame (QoS_null)) to the target device at full CBW. Therefore, the sensing device may predictably and reliably receive a response (e.g., an L2 ACK) from the target device. However, because the L2 ACK is inherently a 20 MHz response, the sensing device may be unable to ensure that the response is transmitted at full CBW (e.g., 80 MHz) even when the L2 frame is transmitted at full CBW.

In some cases, the target device may transmit the L2 ACK at full CBW. For example, the target device may duplicate the L2 ACK over the entire bandwidth. However, the sensing device may not be configured to extract CFR from the duplicated bandwidth regions. Thus, the variability of the response bandwidth of the L2 ACK creates a non-optimal solution as far as accuracy of motion detection is concerned.

Some techniques and apparatuses described herein enable a network node (e.g., a sensing device) to continuously and reliably receive a response at full CBW from another network node (e.g., a target device). For example, in some aspects, a network node may transmit an L2.5 frame as an L2 data packet at full CBW. Providing a response to the L2.5 may be necessary to ensure the operational success of the target device within the network.

For example, the L2.5 frame may comprise an address resolution protocol (ARP) request and the target device may transmit an ARP response that is configured to bind the internet protocol (IP) address of the target device (e.g., L3)

to the MAC address of the target device (e.g., L2). The target device may be configured to always transmit a response to an ARP request to ensure that the target device is able to operate within the network. As a result, the sensing device may accurately determine motion data based at least in part on heatmaps generated from CBW associated with the responses received from the target device. Responses may come in full CBW, as opposed to 20 MHz content and duplicated CFR. Responses may come all of the time whenever queried by the AP to avoid the subsampling of the response.

Figure 3:
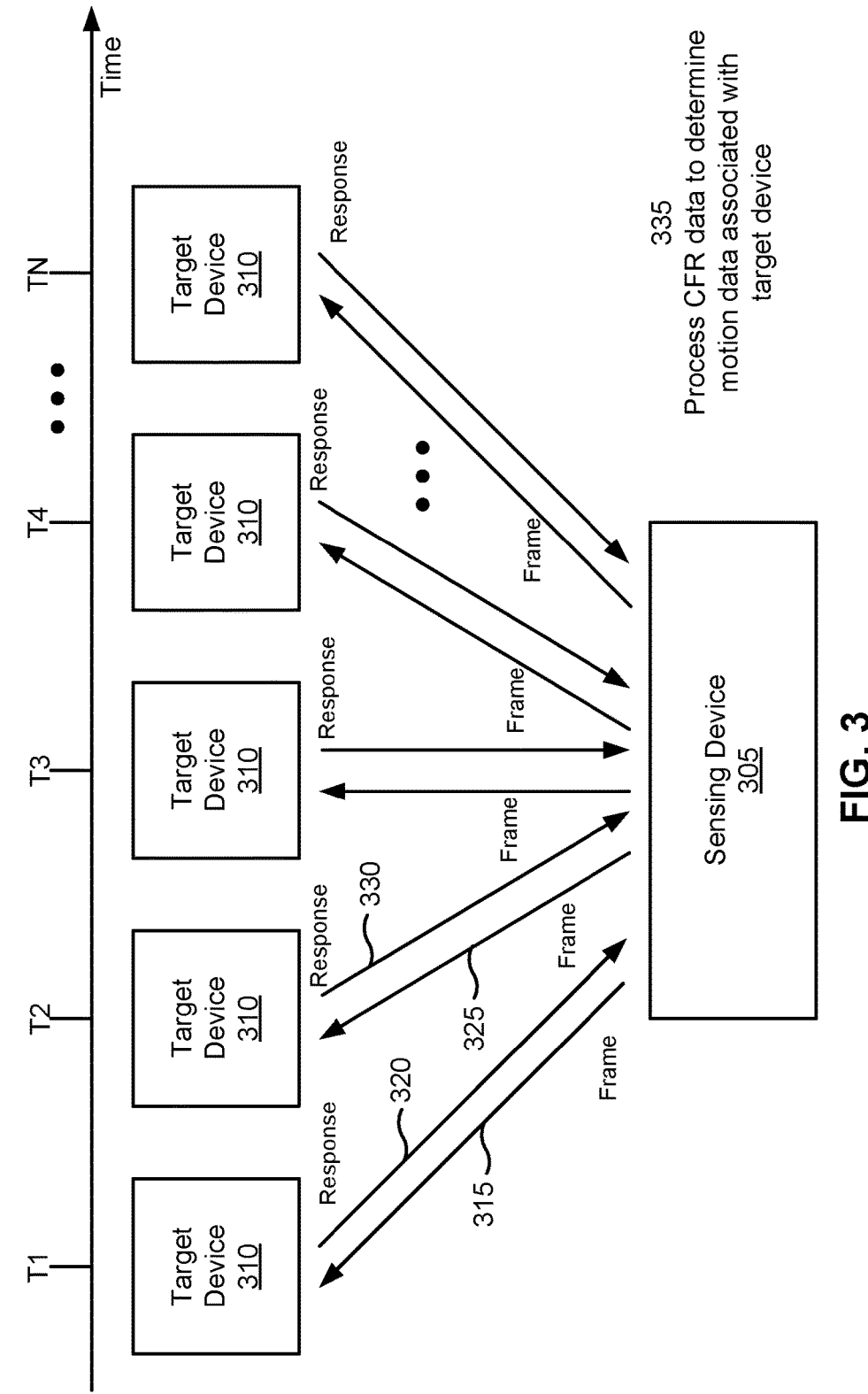
FIG. 3 is a diagram illustrating an example associated with performing radio frequency (RF) sensing, in accordance with the present disclosure.

FIG. 3 is a diagram illustrating an example 300 associated with performing RF sensing, in accordance with the present disclosure. As shown in FIG. 3, a sensing device 305 and a target device 310 may communicate with one another. In some aspects, the sensing device 305 and the target device 310 may be included in a WLAN (e.g., network 100).

The sensing device 305 may include a device that is configured to capture CFR data and/or to generate motion data based at least in part on captured CFR data. In some aspects, the sensing device 305 may include an AP. For example, the sensing device 305 may include an AP that is configured to perform RF sensing to determine motion data for one or more devices located in a vicinity of the sensing device 305.

Additionally, or alternatively, the target device 310 may include a STA. For example, the target device 310 may include a STA configured to perform one or more functions of an AP within a WLAN or a STA connected to an AP, among other examples.

The target device 310 may include a device for which motion data is to be obtained. For example, the target device 310 may include an AP and/or a STA, among other examples.

As shown by reference number 315, the sensing device 305 may transmit a frame to the target device 310. The sensing device 305 may transmit the frame at a first time (T1, as shown). In some aspects, the frame may comprise an L2.5 frame. For example, the frame may comprise an ARP request frame, a multicast frame, a broadcast filtering frame, or an L2 keep-alive frame.

In some aspects, the L2.5 frame is transmitted within an L2 data packet at full CBW. By transmitting the frame as an L2 data packet, the sensing device 305 may cause a SoC (rather than an L3 stack) of the target device 310 to transmit an L2.5 response to the sensing device 305 using another L2 data packet at full CBW. Because the response is associated with an L2.5 frame, the sensing device 305 may cause the target device 310 to transmit a response at a bandwidth at which the L2 data packet is received (e.g., full CBW).

The target device 310 may receive the L2 data packet and may generate a response to the L2.5 frame based at least in part on receiving the L2 data packet. The target device 310 may determine a bandwidth at which the L2 data packet was received based at least in part on the response being associated with the L2.5 frame. As shown by reference number 320, the target device 310 may transmit a response to the frame to the sensing device 305 at full CBW.

In some aspects, the sensing device 305 may capture CFR data associated with the response. The sensing device 305 may determine motion data associated with an object (e.g., the target device 310) based at least in part on the CFR data, as described in greater detail elsewhere herein. Additionally, or alternatively, the sensing device 305 may provide the CFR data and/or a heatmap associated with the CFR data to another device (e.g., a server device (not shown)) and the other device may generate motion data based at least in part on the CFR data.

As shown by reference number 325, the sensing device 305 may transmit a second frame to the target device 310. In some aspects, the sensing device 305 may transmit the second frame at a second time (e.g., T2, as shown). In some aspects, the sensing device 305 may transmit the second frame at full CBW. In some aspects, the second frame may comprise an L2.5 frame and the sensing device 305 may transmit the L2.5 frame as an L2 data packet at full CBW in a manner similar to that described above.

In some aspects, the second frame may comprise an L2 frame. For example, the sensing device 305 may configured to utilize a hybrid process for performing RF sensing. In some aspects, the hybrid process may include periodically transmitting an L2.5 frame as an L2 data packet at a first interval followed by a particular quantity of periodically transmitted L2 frames. For example, the sensing device 305 may be configured to transmit three L2 frames after transmitting an L2.5 frame as an L2 data packet.

In some aspects, the particular quantity of periodically transmitted L2 frames may be transmitted at a second interval. In some aspects, the second interval may be smaller than the first interval. For example, the first interval may be 30 milliseconds (ms), and the second interval may be 10 ms.

As shown by reference number 330, the target device 310 may transmit a response to the sensing device 305 based at least in part on receiving the second frame.

In some aspects, the response may be transmitted at full CBW. For example, the sensing device 305 may transmit an L2.5 frame as an L2 data packet at full CBW, and the target device 310 may transmit the response at full CBW based at least in part on the response being associated with an L2.5 packet and/or the L2 data packet being transmitted by the sensing device 305 at full CBW.

In some aspects, the response may be transmitted at less than full CBW. For example, the sensing device 305 may transmit an L2 frame (e.g., a QoS_null frame) to the target device 310 at full CBW and the target device 310 may be configured to automatically transmit a L2 ACK at 20 MHz based at least in part on receiving the L2 frame.

In some aspects, the sensing device 305 may capture CFR data associated with the response. In some aspects, the sensing device 305 may capture CFR data associated with the response. The sensing device 305 may determine motion data associated with an object (e.g., the target device 310) based at least in part on the CFR data, as described in greater detail elsewhere herein. Additionally, or alternatively, the sensing device 305 may provide the CFR data and/or a heatmap associated with the CFR data to another device.

In some aspects, the sensing device 305 may transmit one or more additional L2.5 frames as L2 data packets and/or one or more additional L2 frames and may capture CFR data associated with the one or more additional L2.5 frames as L2 data packets and/or L2 frames in a manner similar to that described above. In some aspects, the sensing device 305 may transmit the one or more additional L2.5 frames as L2 data packets and/or L2 frames until a quantity (e.g., 100, 500, or 1,000 L2.5 frames and/or L2 frames, among other examples) of frames are transmitted.

In some aspects, the sensing device 305 may transmit the one or more additional L2.5 frames as L2 data packets and/or L2 frames until CFR data is captured for a quantity of responses (e.g., a quantity of responses transmitted at CBW and/or a total quantity of responses). Additionally, or alternatively, the sensing device 305 may transmit the one or more additional L2.5 frames as L2 data packets and/or L2 frames for a particular amount of time (e.g., 100, ms, 1 second, or 2 seconds, among other examples).

As shown by reference number 335, the sensing device 305 may process the captured CFR data (e.g., heatmaps associated with the CFR data) to determine motion data associated with the target device 310 and/or an object associated with the target device 310. For example, the sensing device 305 may provide the CFR data and/or the heatmaps associated with the CFR data as inputs to a machine learning model that is trained to determine motion data based at least in part on the CFR data and/or heatmaps. In some aspects, the motion data may indicate whether the target device 310 and/or the object is moving or stationary. In some aspects, when the motion data indicates that the target device 310 and/or the object is moving, the motion data may indicate a direction and/or a speed of the movement.

In some aspects, the sensing device 305 may modify a type of frame transmitted to the target device 310 based at least in part on whether the motion data indicates that the target device 310 and/or the object is moving. As an example, initially, the sensing device 305 may transmit a series of L2.5 frames as L2 data packets at full CBW to the target device 310 and may capture CFR data for a series of responses transmitted by the target device 310. The sensing device 305 may process the captured CFR data (e.g., heatmaps associated with the CFR data) to determine motion data associated with the target device 310 and/or an object associated with the target device 310.

In some aspects, when the motion data indicates that the target device 310 and/or the object is stationary, the sensing device 305 may transmit a quantity of L2 frames at full constant bit rate (CBR) between each transmission of L2 data packets that include L2.5 frames. In some aspects, when the motion data indicates that the target device 310 and/or the object is moving, the sensing device 305 may continue to transmit the series of L2.5 frames as L2 data packets at full CBW to the target device 310.

As another example, initially, the sensing device 305 may transmit a quantity of L2 frames at full CBR between each transmission of L2 data packets that include L2.5 frames and may capture CFR data for a series of responses transmitted by the target device 310. The sensing device 305 may process the captured CFR data (e.g., heatmaps associated with the CFR data) to determine motion data associated with the target device 310 and/or an object associated with the target device 310.

In some aspects, when the motion data indicates that the target device 310 and/or the object is stationary, the sensing device 305 may continue to transmit a quantity of L2 frames at full CBR between each transmission of L2 data packets that include L2.5 frames. In some aspects, when the motion data indicates that the target device 310 and/or the object is moving, the sensing device 305 may transmit a series of L2.5 frames as L2 data packets at full CBW and/or may not transmit the quantity of L2 frames between each transmission of L2 data packets that include L2.5 frames to the target device 310.

In some aspects, the sensing device 305 may perform one or more actions based at least in part on the motion data. For example, the sensing device 305 may output the motion data to another device (e.g., the target device 310, a device associated with a particular user, and/or a server device, among other examples), determine a potential destination to which the target device 310 may be traveling, and/or determine an object being viewed by a user associated with the target device 310, among other examples.

In some aspects, requests triggered by the sensing device 305 may utilize a hybrid process by sending N−1 QoS_null (L2) frames and then fortifying the hypothesis with a single ARP frame (L2.5) over an M millisecond (ms) operation. For example, the process may include transmitting an L2 frame at 0 ms and 10 ms, an L2.5 frame at 20 ms, an L2 frame at 30 ms, 40 ms, and 50 ms, an L2.5 frame at 60 ms, and an L2 frame at 70 ms.

As indicated above, FIG. 3 is provided as an example. Other examples may differ from what is described with respect to FIG. 3.

Figure 4:
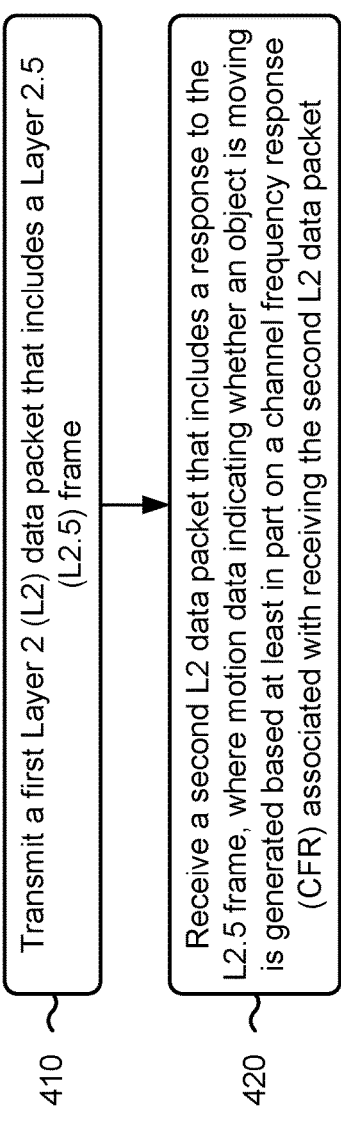
FIG. 4 is a diagram illustrating an example process associated with performing RF sensing, in accordance with the present disclosure.

FIG. 4 is a diagram illustrating an example process 400 performed, for example, by a sensing device, in accordance with the present disclosure. Example process 400 is an example where the sensing device (e.g., sensing device 305) performs operations associated with RF sensing.

As shown in FIG. 4, in some aspects, process 400 may include transmitting a first L2 data packet that includes an L2.5 frame (block 410). For example, the sensing device (e.g., using communication manager 140/150 and/or transmission component 504, depicted in FIG. 5) may transmit a first L2 data packet that includes an L2.5 frame, as described above.

As further shown in FIG. 4, in some aspects, process 400 may include receiving a second L2 data packet that includes a response to the L2.5 frame, where motion data indicating whether an object is moving is generated based at least in part on a CFR associated with receiving the second L2 data packet (block 420). For example, the sensing device (e.g., using communication manager 140/150 and/or reception component 502, depicted in FIG. 5) may receive a second L2 data packet that includes a response to the L2.5 frame, where motion data indicating whether an object is moving is generated based at least in part on a CFR associated with receiving the second L2 data packet, as described above.

Process 400 may include additional aspects, such as any single aspect or any combination of aspects described below and/or in connection with one or more other processes described elsewhere herein.

In a first aspect, the sensing device comprises an AP.

In a second aspect, alone or in combination with the first aspect, the sensing device comprises a client device.

In a third aspect, alone or in combination with one or more of the first and second aspects, the L2.5 frame comprises an ARP request and the response comprises an ARP response.

In a fourth aspect, alone or in combination with one or more of the first through third aspects, the first L2 data packet is transmitted at a full channel bandwidth and the second L2 data packet is received at the full channel bandwidth.

In a fifth aspect, alone or in combination with one or more of the first through fourth aspects, process 400 includes transmitting one or more L2 frames based at least in part on transmitting the first L2 data packet, and transmitting a third L2 data packet that includes another ARP request based at least in part on transmitting the one or more L2 frames.

In a sixth aspect, alone or in combination with one or more of the first through fifth aspects, the one or more L2 frames comprise one or more QoS_null frames.

In a seventh aspect, alone or in combination with one or more of the first through sixth aspects, the first L2 data packet is periodically transmitted at a first interval, and process 400 comprises transmitting one or more L2 frames at a second interval that is less than the first interval.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
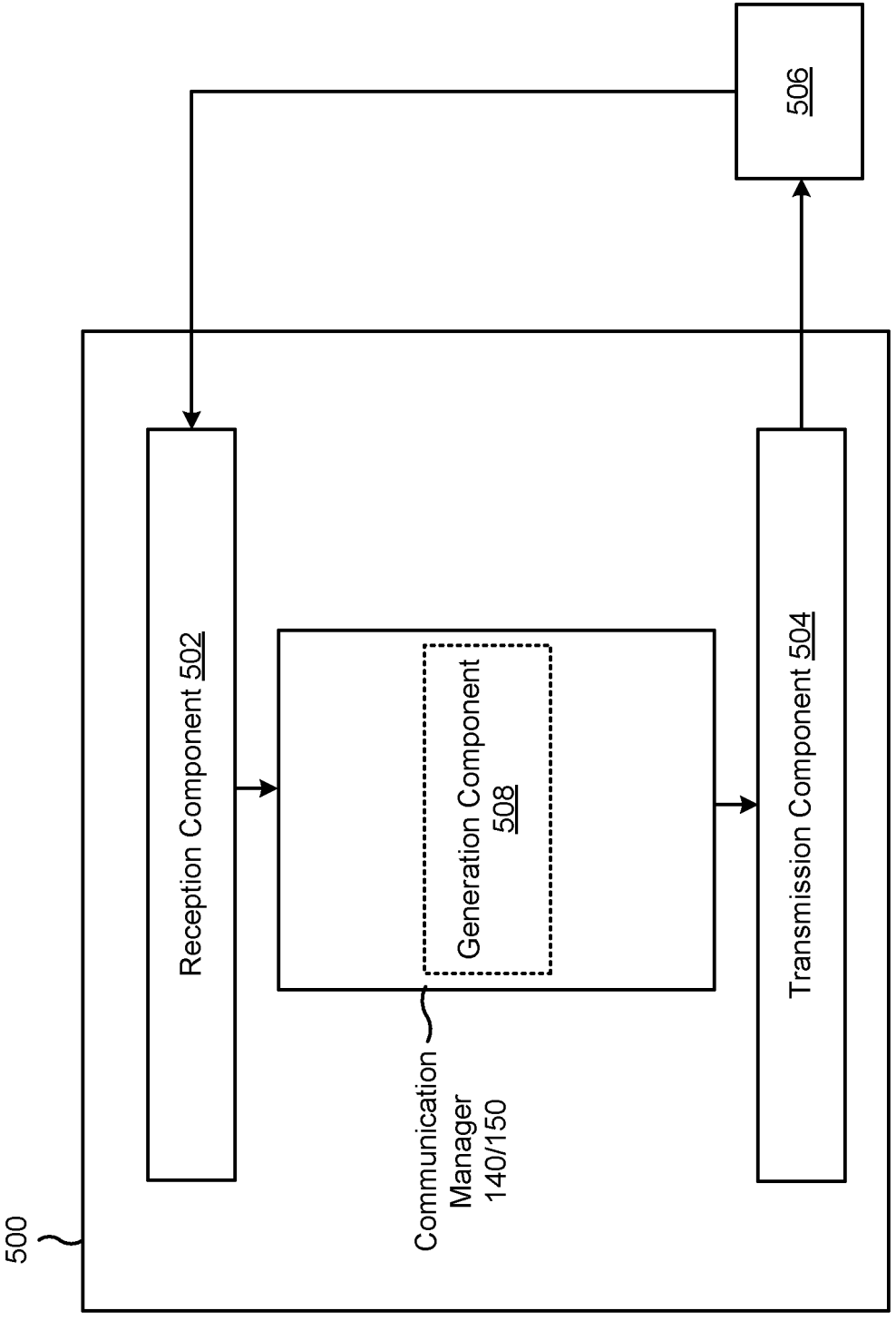
FIG. 5 is a diagram of an example apparatus for wireless communication, in accordance with the present disclosure.

FIG. 5 is a diagram of an example apparatus 500 for wireless communication. The apparatus 500 may be a sensing device, or a sensing device may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a STA, an AP, or another wireless communication device) using the reception component 502 and the transmission component 504. As further shown, the apparatus 500 may include the communication manager 140/150. For example, the apparatus 500 may include the communication manager 140 based at least in part on the apparatus 500 corresponding to a STA 120, and the apparatus 500 may include the communication manager 150 based at least in part on the apparatus 500 corresponding to an AP 110. The communication manager 140/150 may include a generation component 508, among other examples.

In some aspects, the apparatus 500 may be configured to perform one or more operations described herein in connection with FIG. 3. Additionally, or alternatively, the apparatus 500 may be configured to perform one or more processes described herein, such as process 400 of FIG. 4. In some aspects, the apparatus 500 and/or one or more components shown in FIG. 5 may include one or more components of the sensing device described in connection with FIG. 2. Additionally, or alternatively, one or more components shown in FIG. 5 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 500. In some aspects, the reception component 502 may include one or more antennas, a modem, a demodulator, a MIMO detector, a receive processor, a controller/processor, a memory, or a combination thereof, of the sensing device described in connection with FIG. 2.

The transmission component 504 may transmit communications, such as reference signals, control information, data communications, or a combination thereof, to the apparatus 506. In some aspects, one or more other components of the apparatus 500 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modem, a modulator, a transmit MIMO processor, a transmit processor, a controller/processor, a memory, or a combination thereof, of the sensing device described in connection with FIG. 2. In some aspects, the transmission component 504 may be co-located with the reception component 502 in a transceiver.

The transmission component 504 may transmit a first L2 data packet that includes an L2.5 frame. The reception component 502 may receive a second L2 data packet that includes a response to the L2.5 frame. In some aspects, the generation component 508 may generate motion data indicating whether an object is moving based at least in part on a CFR associated with receiving the second L2 data packet.

The transmission component 504 may transmit one or more L2 frames based at least in part on transmitting the first L2 data packet. The transmission component 504 may transmit a third L2 data packet that includes another ARP request based at least in part on transmitting the one or more L2 frames.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of (one or more) components shown in FIG. 5 may perform one or more functions described as being performed by another set of components shown in FIG. 5.

The following provides an overview of some Aspects of the present disclosure:

Aspect 1: A method of wireless communication performed by a sensing device, comprising: transmitting a first L2 data packet that includes an L2.5 frame; and receiving a second L2 data packet that includes a response to the L2.5 frame, wherein motion data indicating whether an object is moving is generated based at least in part on a CFR associated with receiving the second L2 data packet.

Aspect 2: The method of Aspect 1, wherein the sensing device comprises an access point.

Aspect 3: The method of one or more of Aspects 1 and 2, wherein the sensing device comprises a client device (e.g., a STA 120).

Aspect 4: The method of one or more of Aspects 1 through 3, wherein the L2.5 frame comprises an ARP request and the response comprises an ARP response.

Aspect 5: The method of one or more of Aspects 1 through 4, wherein the first L2 data packet is transmitted at a full CBW and the second L2 data packet is received at the full CBW.

Aspect 6: The method of one or more of Aspects 1 through 5, further comprising: transmitting one or more L2 frames based at least in part on transmitting the first L2 data packet; and transmitting a third L2 data packet that includes another ARP request based at least in part on transmitting the one or more L2 frames.

Aspect 7: The method of Aspect 6, wherein the one or more L2 frames comprise one or more QoS_null frames.

Aspect 8: The method of one or more of Aspects 1 through 7, wherein the first L2 data packet is periodically transmitted at a first interval, and wherein the method further comprises: transmitting one or more L2 frames at a second interval that is less than the first interval.

Aspect 9: An apparatus for wireless communication at a device, comprising a processor; memory coupled with the processor; and instructions stored in the memory and executable by the processor to cause the apparatus to perform method of one or more of Aspects 1 through 8.

Aspect 10: A device for wireless communication, comprising a memory and one or more processors coupled to the memory, the one or more processors configured to perform the method of one or more of Aspects 1 through 8.

Aspect 11: An apparatus for wireless communication, comprising at least one means for performing the method of one or more of Aspects 1 through 8.

Aspect 12: A non-transitory computer-readable medium storing code for wireless communication, the code comprising instructions executable by a processor to perform the method of one or more of Aspects 1 through 8.

Aspect 13: A non-transitory computer-readable medium storing a set of instructions for wireless communication, the set of instructions comprising one or more instructions that, when executed by one or more processors of a device, cause the device to perform the method of one or more of Aspects 1 through 8.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A sensing device for wireless communication, comprising:
  one or more memories; and
  one or more processors, coupled to the one or more memories, configured to:
    transmit a first layer 2 (L2) data packet that includes a layer 2.5 (L2.5) frame, wherein the L2.5 frame is transmitted between two or more L2 frames, wherein the two or more L2 frames comprise two or more null frames, and wherein the first L2 data packet is periodically transmitted at a first interval and the two or more L2 frames are periodically transmitted at a second interval; and
    receive a second L2 data packet that includes a response to the L2.5 frame, wherein motion data indicating whether an object is moving is generated based at least in part on a channel frequency response (CFR) associated with receiving the second L2 data packet.

2. The sensing device of claim 1, wherein the sensing device comprises an access point.

3. The sensing device of claim 1, wherein the sensing device comprises a client device.

4. The sensing device of claim 1, wherein the L2.5 frame comprises an address resolution protocol (ARP) request and the response comprises an ARP response.

5. The sensing device of claim 1, wherein the first L2 data packet is transmitted at a full channel bandwidth and the second L2 data packet is received at the full channel bandwidth.

6. The sensing device of claim 1, wherein the one or more processors are further configured to:
  transmit the two or more L2 frames based at least in part on transmitting the first L2 data packet; and transmit a third L2 data packet that includes another ARP request based at least in part on transmitting the two or more L2 frames.

7. The sensing device of claim 6, wherein the two or more L2 frames comprise two or more quality of service frames.

8. The sensing device of claim 1, wherein the second interval is less than the first interval.

9. A method of wireless communication performed by a sensing device, comprising:
  transmitting a first layer 2 (L2) data packet that includes a layer 2.5 (L2.5) frame, wherein the L2.5 frame is transmitted between two or more L2 frames, wherein the two or more L2 frames comprise two or more null frames, and wherein the first L2 data packet is periodically transmitted at a first interval and the two or more L2 frames are periodically transmitted at a second interval; and
  receiving a second L2 data packet that includes a response to the L2.5 frame, wherein motion data indicating whether an object is moving is generated based at least in part on a channel frequency response (CFR) associated with receiving the second L2 data packet.

10. The method of claim 9, wherein the sensing device comprises an access point.

11. The method of claim 9, wherein the sensing device comprises a client device.

12. The method of claim 9, wherein the L2.5 frame comprises an address resolution protocol (ARP) request and the response comprises an ARP response.

13. The method of claim 9, wherein the first L2 data packet is transmitted at a full channel bandwidth and the second L2 data packet, including the L2.5 frame, is received at the full channel bandwidth.

14. The method of claim 9, further comprising:
  transmitting the two or more L2 frames based at least in part on transmitting the first L2 data packet; and
  transmitting a third L2 data packet that includes another ARP request based at least in part on transmitting the two or more L2 frames.

15. The method of claim 14, wherein the two or more L2 frames comprise two or more quality of service frames.

16. The method of claim 9, wherein the second interval is less than the first interval.

17. A non-transitory computer-readable medium storing a set of instructions for wireless communication, the set of instructions comprising:
  one or more instructions that, when executed by one or more processors of a sensing device, cause the sensing device to:
    transmit a first layer 2 (L2) data packet that includes a layer 2.5 (L2.5) frame, wherein the L2.5 frame is transmitted between two or more L2 frames, wherein the two or more L2 frames comprise two or more null frames, and wherein the first L2 data packet is periodically transmitted at a first interval and the two or more L2 frames are periodically transmitted at a second interval; and
    receive a second L2 data packet that includes a response to the L2.5 frame, wherein motion data indicating whether an object is moving is generated based at least in part on a channel frequency response (CFR) associated with receiving the second L2 data packet.

18. The non-transitory computer-readable medium of claim 17, wherein the sensing device comprises an access point.

19. The non-transitory computer-readable medium of claim 17, wherein the sensing device comprises a client device.

20. The non-transitory computer-readable medium of claim 17, wherein the L2.5 frame comprises an address resolution protocol (ARP) request and the response comprises an ARP response.

21. The non-transitory computer-readable medium of claim 17, wherein the first L2 data packet is transmitted at a full channel bandwidth and the second L2 data packet is received at the full channel bandwidth.

22. The non-transitory computer-readable medium of claim 17, wherein the one or more instructions further cause the sensing device to:

transmit the two or more L2 frames based at least in part on transmitting the first L2 data packet; and transmit a third L2 data packet that includes another ARP request based at least in part on transmitting the two or more L2 frames.

23. The non-transitory computer-readable medium of claim 22, wherein the two or more L2 frames comprise two or more quality of service frames.

24. The non-transitory computer-readable medium of claim 17, wherein the second interval is less than the first interval.

\* \* \* \* \*